United States Patent [19]

Ohtsuka et al.

[11] Patent Number: 5,016,868
[45] Date of Patent: May 21, 1991

[54] AUTOMATIC DOCUMENT TRANSFER DEVICE

[75] Inventors: Nobukazu Ohtsuka; Hiroyuki Nagai; Mitsugu Shibanaka, all of Osaka; Toshikazu Matsui, Kyogo, all of Japan

[73] Assignee: Mita Industrial Co., Ltd., Osaka, Japan

[21] Appl. No.: 438,351

[22] Filed: Nov. 16, 1989

[30] Foreign Application Priority Data

Nov. 17, 1988 [JP] Japan .................... 63-292012

[51] Int. Cl.⁵ .................................... B65H 5/06
[52] U.S. Cl. .......................... 271/273; 271/10
[58] Field of Search ........... 271/3.1, 10, 264, 272-274; 355/308, 309

[56] References Cited

U.S. PATENT DOCUMENTS

| | | | |
|---|---|---|---|
| 4,674,735 | 6/1987 | DuBois et al. | 271/10 |
| 4,813,612 | 3/1989 | Kano et al. | 271/10 |
| 4,850,581 | 7/1989 | Hayakawa et al. | 271/10 |

FOREIGN PATENT DOCUMENTS 236126  9/1989  Japan .................... 271/10

Primary Examiner—Robert P. Olszewski
Assistant Examiner—Steve Reiss
Attorney, Agent, or Firm—Koda and Androlia

[57] ABSTRACT

An automatic document transfer device including a document feeding portion mounted at the document feeding section of the main body of the image forming equipment and a portion for transferring documents to the position of exposure on the document table, which is mounted at the document pusher plate attached to the upper portion of the document table of the main body of the image forming equipment. First and second linkage gears which can be mutually engaged to be connected and disconnected together with opening and closing of the document pusher plate whereby a drive force is transmitted from the document feeding portion to the transferring portion by way of the first and the second linkage gears.

1 Claim, 7 Drawing Sheets

AUTOMATIC DOCUMENT TRANSFER DEVICE

BACKGROUND OF THE INVENTION

1. Field of the Invention

The present invention relates to improvements of an automatic document transfer device by which a document is fed, and transferred and carried out, and further relates to an automatic document transfer device in which means for transmitting a drive force of a document feeding section to a document transferring section has been improved, in an image forming equipment equipped with a document feeding section and a document transferring section, both of which can be engaged and disengaged by opening and closing the document pusher plate.

2. Description of the Prior Art

As one of automatic document transfer devices in the image forming equipment, such a type as consists of a document feeding section having document feeding means therein and installed at the body side of the image forming equipment, and a document pusher plate which is pivotally mounted on the document table of the image forming equipment body so that it can be freely opened and closed, installed in the vicinity of the document feeding section and is provided with transferring means by which a document is transferred to the position of exposure of the document table of the image forming equipment body and is taken out after exposure, is already available.

When automatically transferring a document in such an automatic document transfer device as shown in the above, a document is led from a document tray mounted at the document feeding section to the transferring means through the document feeding means with the document pusher plate closed on the document table on the image forming equipment body.

Furthermore, the document is led to the position of exposure on the document table, and after being exposed it is taken out by the transferring means onto a document receiving section on which the exposed documents are piled.

At this time, conventionally, the document feeding means and the transferring means have been separately driven by an independent source of power, respectively.

An automatic document transfer device by which both the document feeding means has appeared recently and the transferring means which are divided each other and installed adjacent to each other can be driven by a single source of power. Such an automatic document transfer device has been disclosed for instance in the Japanese Patent Application No. Sho-63-61333. However, in such an automatic document transfer device, a linkage member which can be connected and disconnected is needed, respectively, for both the document feeding means and the transferring means because they are separately mounted.

In such an automatic document transfer device 1a as mentioned in the above, as shown in FIG. 7, the document pusher plate 19 is opened up to the position shown with a two-dot dashed line (19') and is shifted down to the position shown with a solid line (19) under the closed condition thereof. In accompanying therewith, the second linkage gear 16 attached to the document pusher plate 19 is shifted down to the position shown with the solid line (16) from the position shown with the two-dot dashed line (16').

On the other hand, the guide plate 25a is pivotally mounted at the side plate 22a fixed at the document feeding portion 10a by way of the rotary axis 24. And the guide plate 25a is always turned and energy-charged in the clockwise direction on the illustration by means of a spring 27. The first linkage gear 8 provided on the guide plate 25a is so composed that the gear 8 can be engaged with the second linkage gear 16 which has been shifted down to the closed position shown with the solid line.

Thus, as the above automatic document transfer operation becomes available upon a completion of engagement between the first linkage gear 8 and the second linkage gear 16, thereby causing a source of power (not illustrated), which is built in the document feeding means 9a of the document feeding section 10a, to stand by.

As mentioned in the above, in the conventional automatic document transfer device 1a, a simple construction is adopted, and the document feeding means 9a and the transferring means 18 are so linked with each other that they can be engaged and disengaged, thereby causing respective means to be driven by a single source of power. Namely, it is convenient in this meaning.

Hereupon, in such an automatic document transfer device 1a mentioned above, as shown in FIG. 7, when the force of a spring 27 is weak, teeth skipping of the above linkage gears may be apt to occur, and especially as it is possible for the first linkage gear 8, which can swing, to escape in the opposite direction of the direction of rotation shown by an arrow 26 when the first linkage gear 8 rotates in the direction of an arrow 28, the teeth skipping is more apt to occur.

For this reason, as normal rotation is not transmitted to the second linkage gear 16, some difference may occur in the transferring distance of the document, thereby causing some hindrance to occur in the processing such as exposure for image forming and noises to be resulted therefrom.

Or in the case that the force of the spring 27 is strong, the above linkage gears are forcedly brought into contact therewith mutually by the energy charged by the spring 27 to eliminate a moderate play between respective teeth, thereby causing large friction to occur when the linkage gears rotate, the source of power to be loaded, and respective teeth thereof to be apt to be worn.

In the case that the force of the spring 27 is still further strong, the document pusher plate 19 at which the second linkage gear 16 is pivotally mounted by the first linkage gear 8 energy-charged by the spring 27 can not keep the prescribed position shown with the solid line (19) but may be floated or raised up.

For this reason, a discrepancy may occur in the positional relationship, which is to be in accord in the case that the force of a spring 27 is adequate, between the document feeding port (not illustrated) open toward the transferring means 18 and the receiving portion (not illustrated) of the transferring means 18 in which a document is received from the document feeding port. Therefore, there is a problem that a document jam is apt to occur at the document feeding portion 10a and the document feeding ability may become worse.

SUMMARY OF THE INVENTION

The present invention has been accomplished to solve these and other problems in the prior art as shown in the above.

It is therefore an object of the present invention to provide an automatic document transfer device in which an adequate engagement of respective linkage gears of the document feeding section and the document pusher plate can be maintained and which can realize good document feeding.

Therefore, the invention provides an automatic document transfer device comprising document feeding means mounted at the document feeding section of the main body of the image forming equipment, means for transferring documents to the position of exposure on the document table, which is mounted at the document pusher plate attached to the upper portion of the document table of the main body of the image forming equipment, the first or the second linkage gear which can mutually engage to be connected and disconnected in accompanying with the opening and closing of the document pusher plate being provided the document feeding means or the transferring means, wherein a drive force being transmitted from the document feeding means to the transferring means by way of the first and the second linkage gears, and characterized by that a guide plate on which the first linkage gear is mounted and which is pivotally supported at the document feeding section so that the guide plate can be swingable in the vertical direction thereof, is fixed at the document feeding section by means of a fixing member at the position where the first and the second linkage gears are engaged with each other.

For instance, according to the automatic document transfer device of the invention, the guide plate by which the first linkage gear is pivotally supported is led toward the second linkage gear which is pivotally supported by the transferring means built in the document pusher plate and is fixed at an adequate position, thereby causing the first and the second linkage gears to be maintained under a moderately engaged condition.

As a result, the first and the second linkage gears can become free from abnormal wearing and noises without any teeth skipping of these linkage gears and/or floating or raising-up of the document pusher plate in operating the automatic document transfer device.

This specification of the present invention specifically points out the subject thereof and is complete with the claims clearly claimed. The above, and other objects, features and advantages of the present invention, will become apparent from the following description taken in conjunction with the accompanying drawings.

DETAILED DESCRIPTION OF THE PREFERRED EMBODIMENTS

Figure 1:
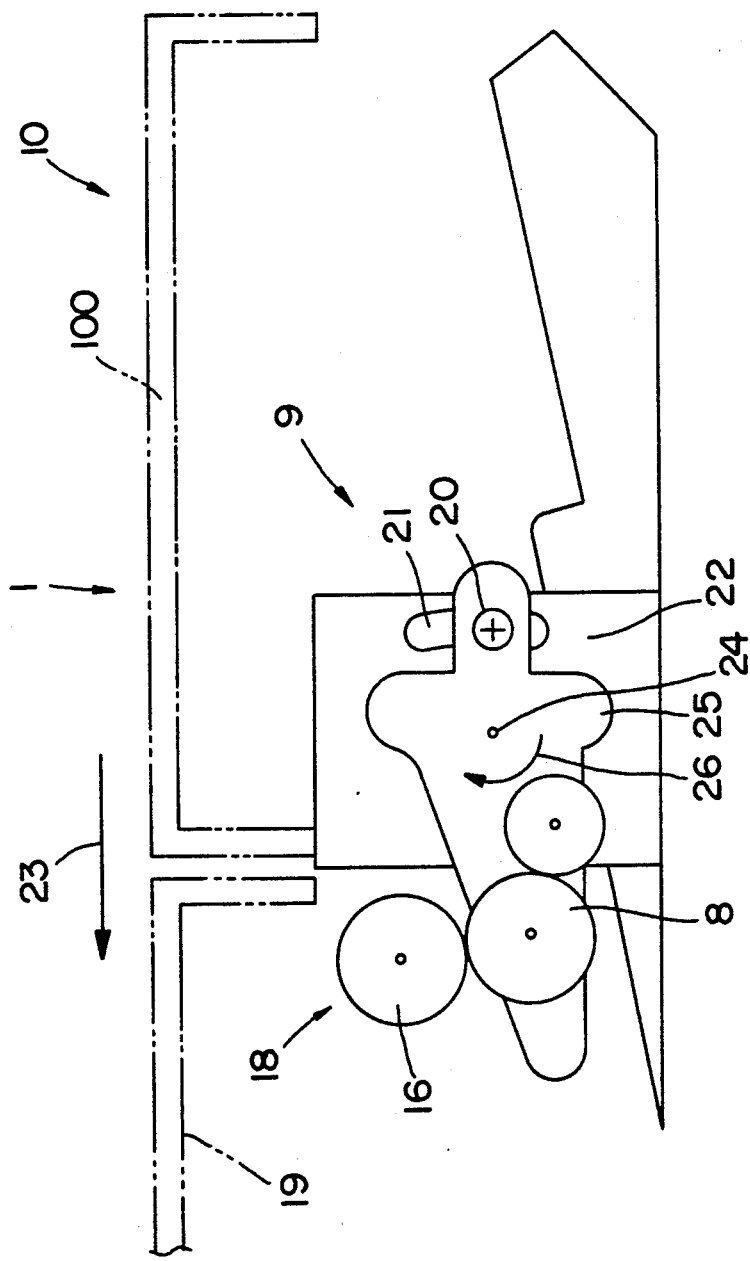
FIG. 1 is a side structural view showing the main parts of the automatic document transfer device of one of the embodiments according to the invention.
Figure 2:
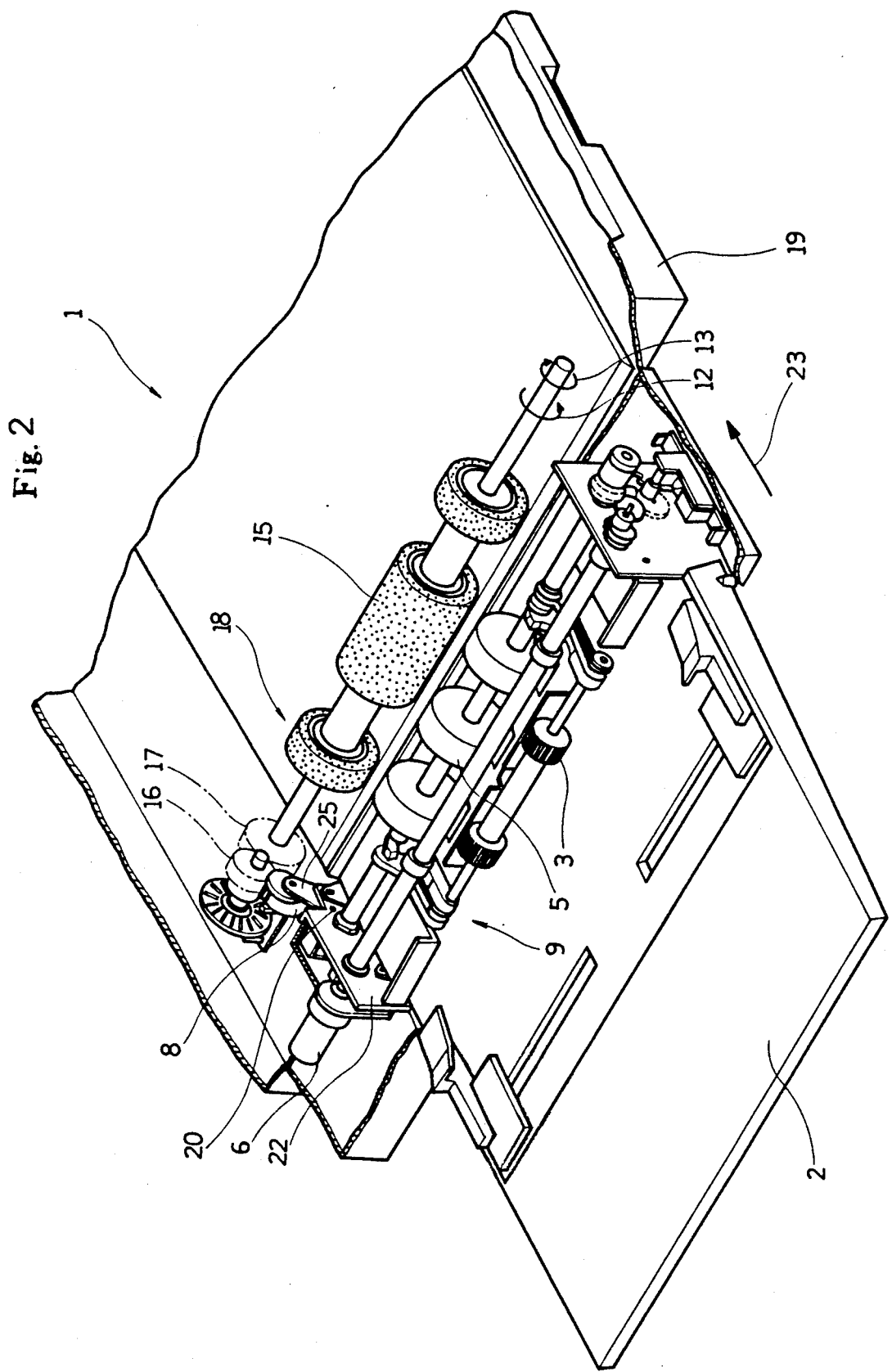
FIG. 2 is a perspective view of the main parts of the automatic document transfer device.
Figure 3:
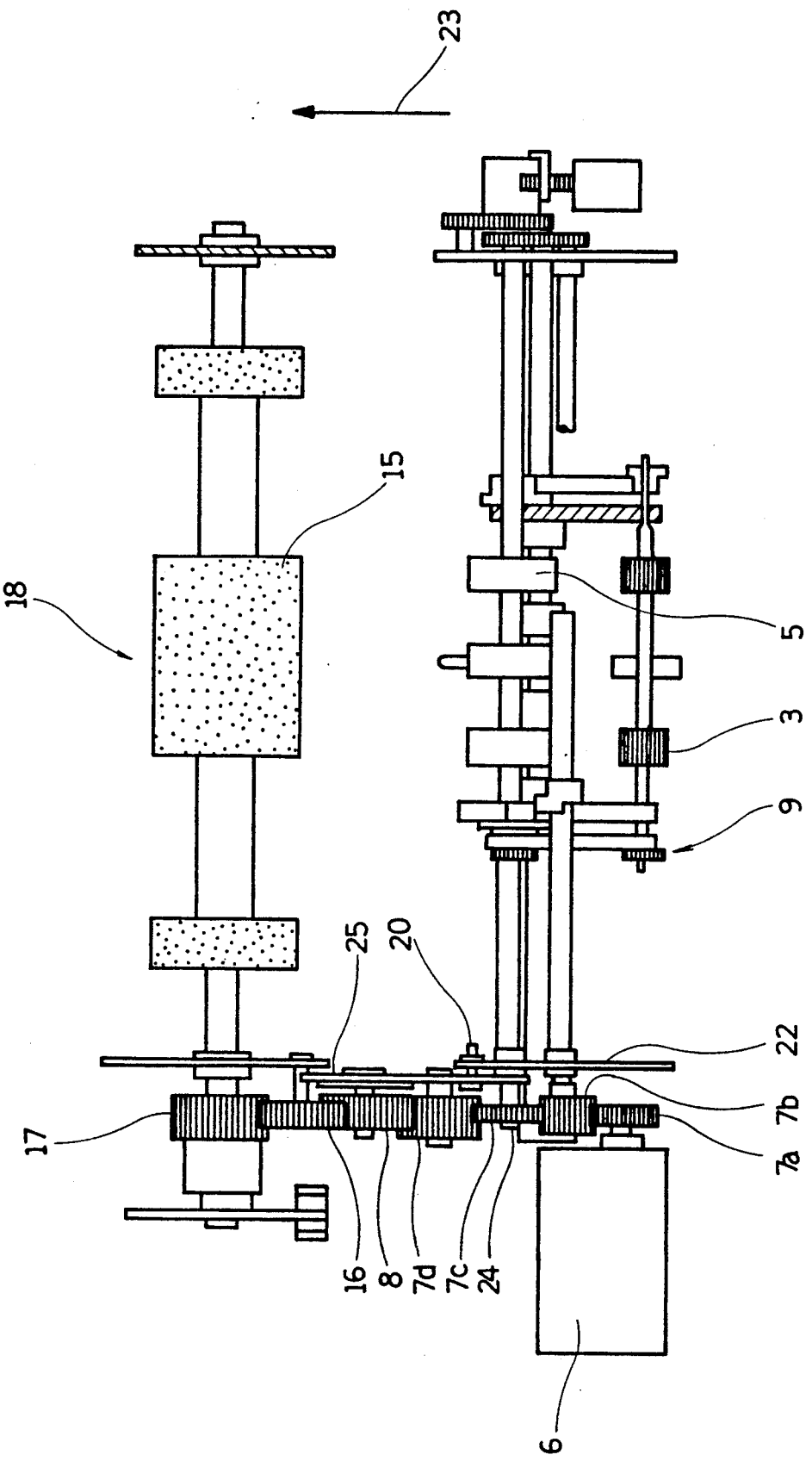
FIG. 3 is a plan view of the main parts of the automatic document transfer device.
Figure 4:
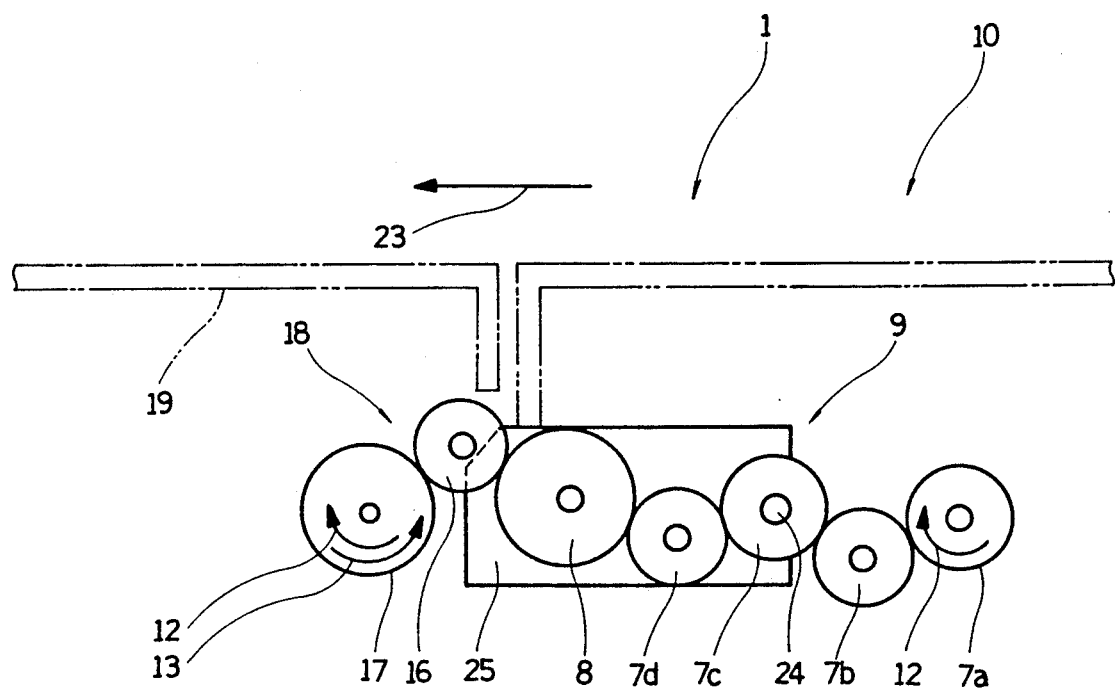
FIG. 4 is a side structural view showing the arrangement of series of gears in the main parts of the automatic document transfer device.
Figure 5:
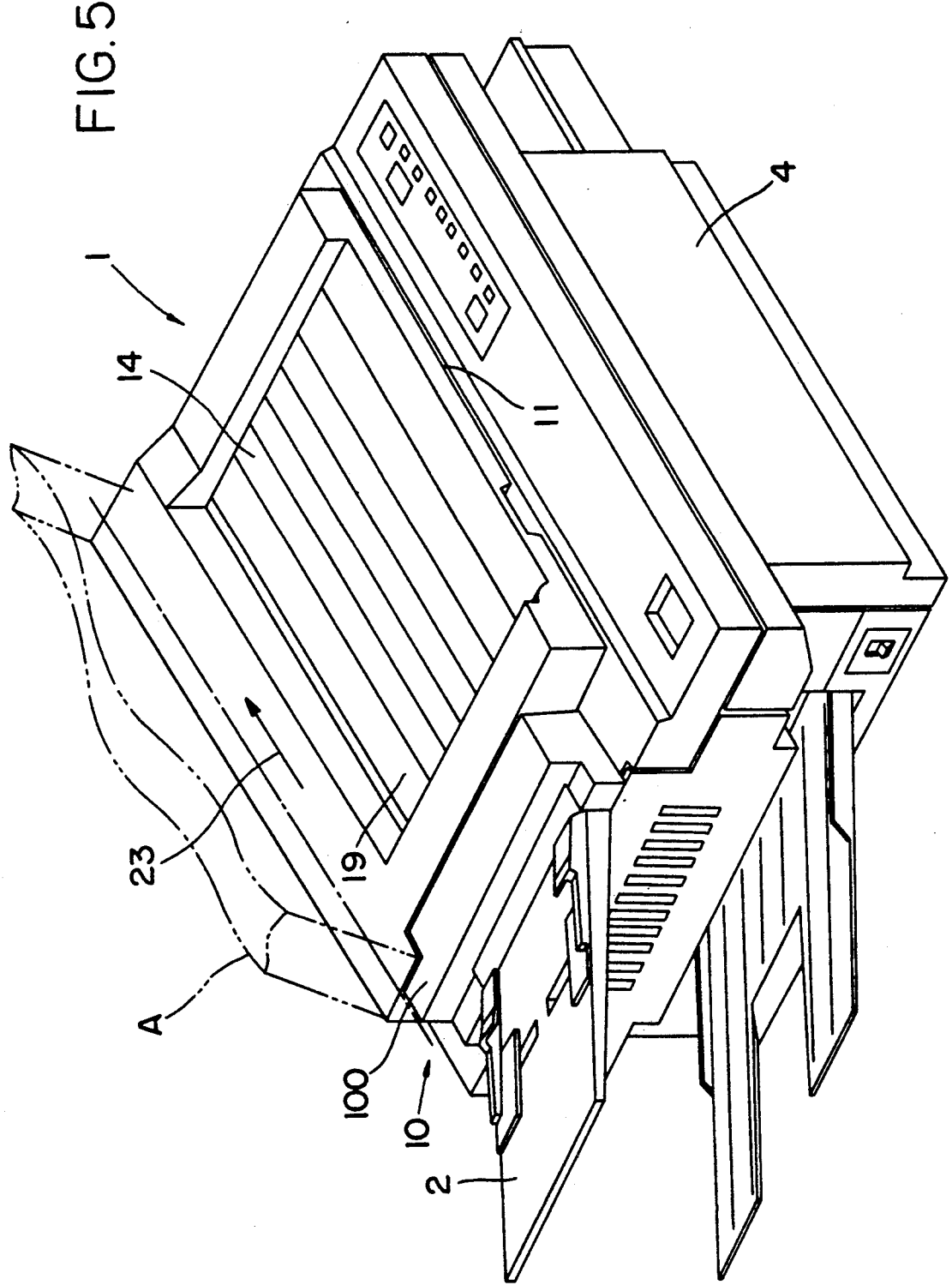
FIG. 5 is the total perspective view of the image forming equipment in which the automatic document transfer device is provided, FIG. 6 (a and FIG. 6 (b) are a sectional simulated view showing the changes of the operating states of a document detecting unit of the automatic document transfer device, FIG. 7 is a side structural view showing the main parts of the conventional automatic document transfer device which is one of the examples of the background of this invention.

As shown in FIG. 2, the automatic document transfer device 1 according to this embodiment of the invention comprises document feeding means 9 which consists of document feeding rollers 3 for carrying piled documents from the document tray 2 into the automatic document transfer device, document feeding rollers 5 for feeding carried-in documents toward the image forming equipment body 4 (FIG. 5) one by one, a source 6 of power for driving the document feeding rollers 3 and another document feeding rollers 5 and a plurality of transmission gears 7a, 7b, 7c, 7d and 8 (FIG. 3) for transmitting the driving force to the document feeding rollers 3 and another document feeding rollers 5, transferring means 18 which consists of a document feeding section 10 fixed and mounted on the upper part at the body side of the image forming equipment body 4, a transferring roller 15 for transferring documents fed from the document feeding section 10 to the position of exposure of the document table 11 on the upper surface of the image forming equipment body 4 (FIG. 5) by rotating normally (counterclockwise as shown by an arrow 12) and, after being exposed, for transferring the documents to the documents receiving portion 14 formed thereon by rotating reversely (clockwise as shown by an arrow 13) and a plurality of transmission gears 16 and 17 for driving the transferring roller 15, and a document pusher plate 19 whose operating side can be opened (as shown by the twodot dashed lines "A" in FIG. 5).

In this embodiment, a pair of transmission gears 8 and 16 are engaged with each other in order to transmit rotary force from the document feeding means 9 to the transferring means 18 when the document pusher plate 19 is closed. Then, the transmission gear 8 at the side of the document feeding means 9 is called the first linkage gear, and the transmission gear 16 at the side of the transferring means 18 is called the second linkage gear. Each of them is distinguished from other linkage gears. The first and the second linkage gears 8 and 16 are separated from each other when the document pusher plate 19 is opened.

The transmission gears 7a and 7b are pivotally supported at the document feeding section 10 and a power source 6 such as a motor is mounted thereon. Also, a side plate 22 on which a long hole 21 is formed for fixing the fixing member 20 is mounted at the outside when being observed in the direction of the right angle in the document feeding direction (an arrow 23). The guide plate 25 which pivotally supports the first linkage gear 8 and a plurality of transmission gears 7c and 7d and which is pivotally supported by an axis 24 common to the transmission gears 7d on the side plate 22 can swing in such a direction (an arrow 26) as the first linkage gear 8 can be engaged with the second linkage gear 16.

In an automatic document transfer device according to the embodiment described in the above, it is necessary to carry out the positioning work of the guide plate 25 in relation to the side plate 22 when assembling and adjusting it before the cover 100 is mounted on the document feeding section.

Namely, an operator closes the document pusher plate 19 toward the document table 11 on the upper surface of the image forming equipment body. Consecutively, the guide plate 25 is turned by the operator until with an adequate backlash the first linkage gear 8 comes into engagement with the second linkage gear 16 which is pivotally supported by the transferring means 18 built in the document pusher plate 19. Then, the guide plate 25 is fixed by the fixing member 20 at a suitable engaging position thereof by the operator. The cover 100 is mounted on the document feeding section and the assembling and adjusting work is completed.

As a result, a moderate engaging state can be maintained between the first and the second linkage gears 8 and 16, and as the document pusher plate 19 is opened, both the gears 8 and 16 are released from their engaging state. document Therefore, when operating the automatic transfer, an optimal engagement can be maintained between the first and the second linkage gears 8 and 16, thereby causing such inconveniences as teeth skipping, teeth noises and wearing to be prevented. In this case, even though the guide plate 25 is caused to swing as shown in the above, the engaging state of all the gears provided in the document feeding means 9 remains unchanged since the axial center of the guide plate 25 is common to the axial center 24 of the transmission gears.

As explained above, as the engagement of respective linkage gears of the document feeding section and the document pusher plate is moderately adjusted and maintained, the document pusher plate is not floated nor raised up or any teeth skipping does not occur in the linkage gears. As a result, the performance pertaining to the document feeding ability and the document transferability has been much improved, noise due to vibrations can be decreased, and abnormal wearing can be prevented, too.

Furthermore, as it is possible to re-adjust the engagement of respective gears even though noise and wearing of the gear teeth occur due to use over a longer period of time, durability of the above described automatic document transfer device is much improved.

Furthermore, the automatic document transfer device 1 according to this embodiment comprises the following feature in order to eliminate a cause of document feeding trouble, that is, the automatic document transfer device 1 starts to operate with the leading edge of a document "B" not accorded in the case that the image processing starts as soon as the document detecting unit 30 detects the document "B".

Figure 6:
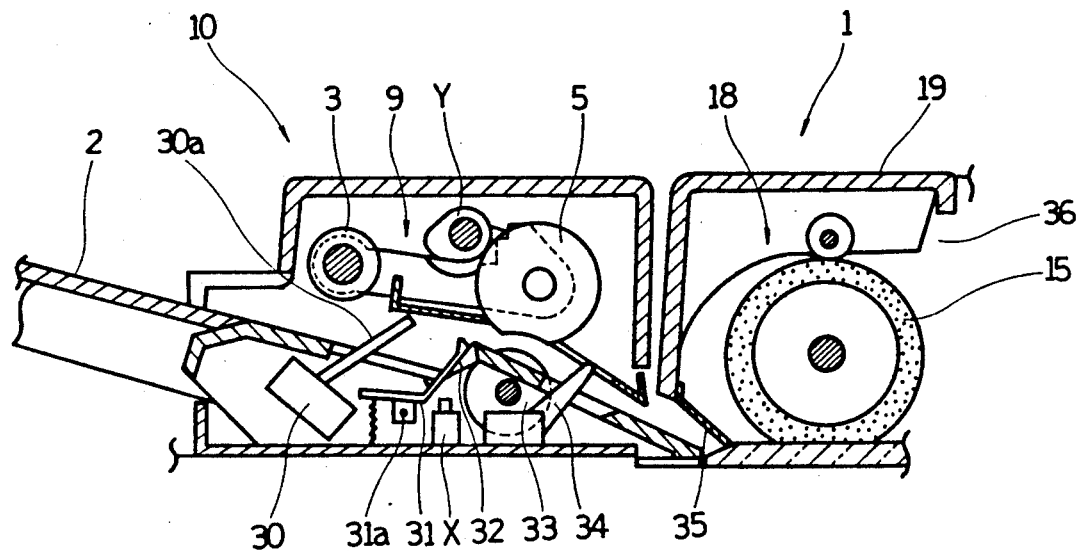
Figure 6:
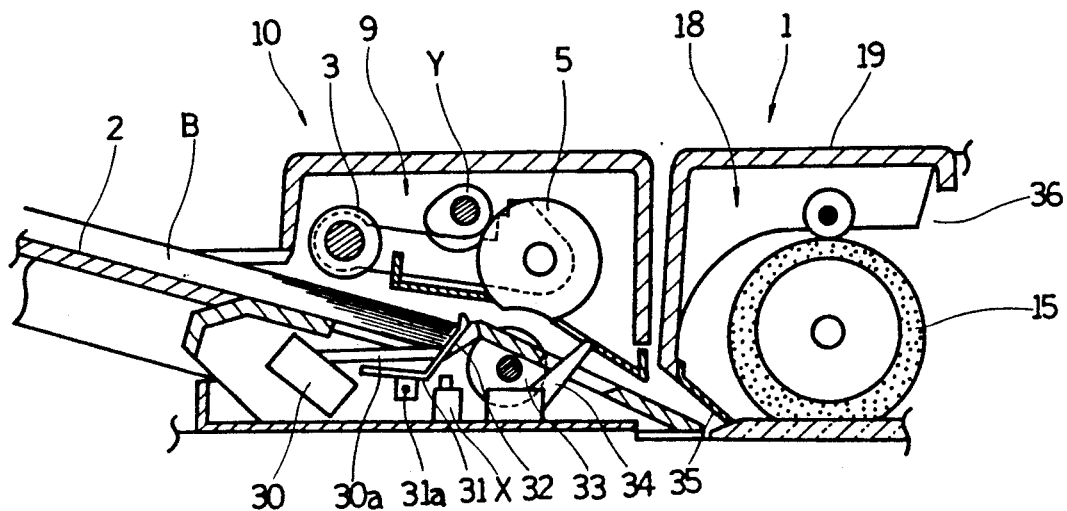
Figure 7:
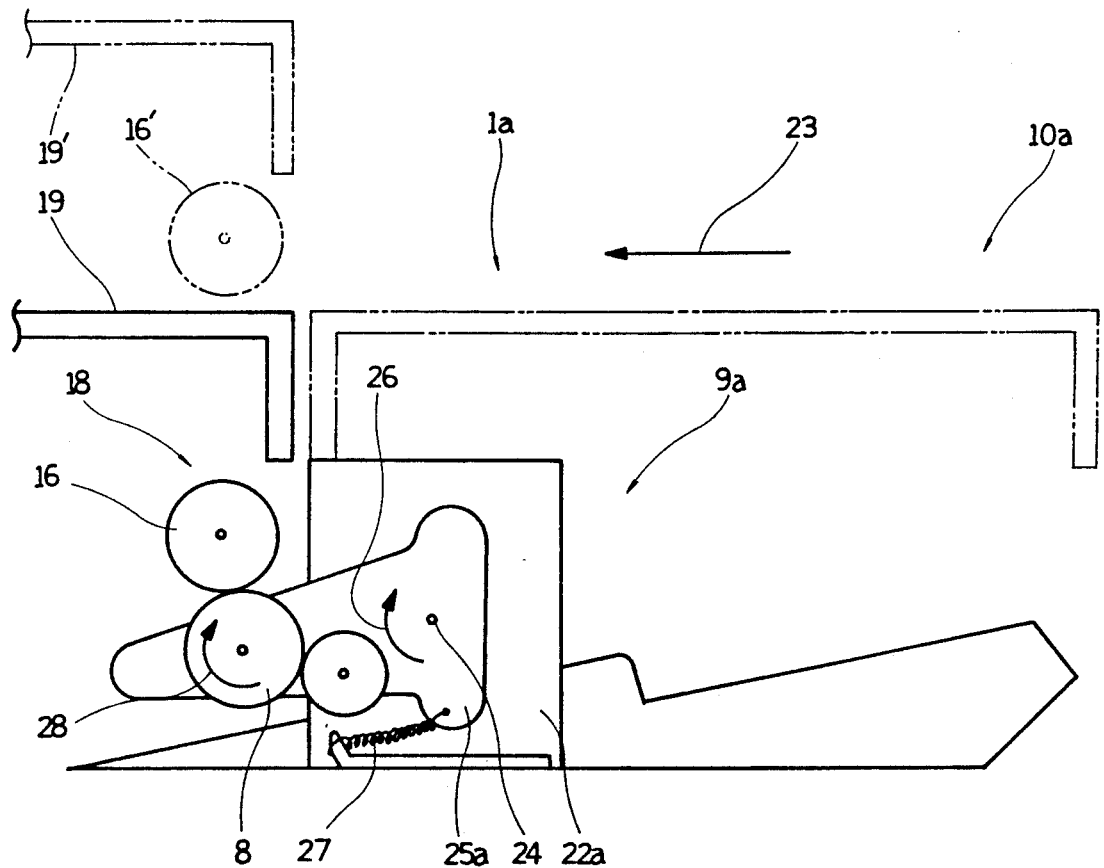

FIG. 6 (a) and FIG. 6 (b) are a sectional simulated view showing the changes of the operating states of a document detecting unit of the automatic document transfer device equipped in the image forming equipment according one of the embodiments of the invention.

The document detecting unit 30 shown in FIG. 6 (a) and FIG. 6 (b) can detect a document according to the changes of inclination of a document detecting lever 30a.

The document detecting unit 30 is so provided in the automatic document transfer device 1 that the document position at which the document detecting unit 30 detects a document and operate and the document position at which the document "B" is accorded by the document stopper 31 can become almost the same. Therefore, the document detecting lever 30a of the document detecting unit 30 is formed to be of such a suitable length as the above object can be realized, and the mounting position of the document detecting unit 30 and the inclination thereof are adjusted in such a manner.

Next, the ensuing description explains the changes of the state of the document detecting unit 30.

FIG. 6 (a) shows a state that any document is not inserted on the document tray 2, and any external force does not operate on the document detecting lever 30a of the document detecting unit 30. Therefore, the document detecting unit 30 is in the state of OFF.

FIG. 6 (b) shows a state after the document "B" is inserted on the document tray 2, and the document detecting lever 30a of the document detecting unit 30 is pushed down by the document "B" and is shifted down Therefore, the document detecting unit 30 is in the state of ON.

At the same time, at least a sheet of documents "B" that has been inserted on the document tray 2 is stored in a document housing portion 32, and the position of the leading edges of the documents "B" is accorded by being brought into contact with the document stopper 31.

The document housing portion 32 which can store at least a sheet of the documents "B" which has been inserted on the document tray 2 by piling the leading edge thereof is provided in the vicinity of the document detecting unit 30.

And the document stopper 31 is provided in the vicinity of the document housing portion 32 in order to accord the leading edges of the inserted documents "B".

In the case that the image processing starts in such an automatic document transfer device as shown in the above, the document stopper 31 is turned toward the downstream for the document feeding direction, centering around the fulcrum 31a by drive of a stopper solenoid "X" after the documents "B" are accorded by the document stopper 31.

Thereafter, the document feeding roller 3 pushes the documents "B" by drive of a cam mechanism "Y", and the document feeding roller 3 rotates by a drive source 6 to transfer the documents "B". Furthermore, only a sheet of the documents "B" is separated and sent by means of the document feeding roller 5 and the separating roller 33.

Then, the document "B" is sent to the position of the transferring roller 15 through a sent-out document detector 34 which can detect the sent-out document and a send-back preventing pawl 35. And the document "B" is transferred to the appointed position of exposure on the document table 11 of the image forming equipment body 4 by means of the transferring roller 15 which can rotate normally, thereby causing the document "B" to be processed for image forming. The image-processed document "B" is transferred in the reverse direction by a reversing transferring roller 15, and the transferring direction is reversed by 180° and is delivered through the document delivery port 36.

As shown in FIG. 6 (b), the automatic document transfer device 1 is so composed that the position of the document whose leading edges are accorded by the document stopper 31 and the position of the document where the document detecting unit 30 operates by detecting the leading edges of a document "B" inserted on the document tray 2 can be substantially the same.

Therefore, in this case, the timing when the document detecting unit 30 detects the leading edge of the document "B" and begins to operate on and the timing when the document "B" has reached the document stopper 31 become the same time.

Therefore, even though the image processing is started as soon as the document detecting unit 30 detects the leading edge of the document "B", any document feeding trouble does not occur and the document "B" can be smoothly transferred as the leading edge of the document "B" has been already brought into contact with the document stopper 31 and accorded thereby.

Subsequently, the document "B" so fed as shown in the above is further sent onto the image forming equipment body 4 by such a manner as conventionally adopted, thereby causing image forming to be processed.

In this specification, it has been described that the document detecting unit 30 is provided with a micro switch, etc. having the document detecting lever 30a. However, an optical sensor may be substituted in place of the micro switch, and it is optional to choose either of them.

Therefore, in the automatic document transfer device according to the embodiment, a document can be always smoothly fed without occurrence of any document feeding trouble.

The invention can be effected and/or carried out in other embodiments without departing from the spirits and substantial features thereof.

Therefore, though the above embodiment is one of the preferred embodiments, the invention is not limited only to the embodiment mentioned in the above.

And it can be easily understood that all the modifications which can be effected in the scope of the claims described hereinafter and the scope meant by the claims are included in the claims hereof.

What is claimed is:

1. An automatic document transfer device comprising a document feeding means mounted at a document feeding section of a main body of the image forming equipment, means for transferring documents to a position of exposure on a document table, which is mounted at a document pusher plate attached to an upper portion of the document table of the main body of the image forming equipment, first and second linkage gears which can mutually be engaged to be connected and disconnected together with an opening closing of the document pusher plate provided between the document feeding means and the transferring means, whereby a drive force is transmitted from the document feeding means to the transferring means by way of the first and the second linkage gears, and characterized in that:

a guide plane on which the first linkage gear is mounted and which is pivotally supported at the document feeding section so that the guide plate is swingable in a vertical direction thereof, is fixed at the document feeding section by means of a fixing member at a position where the first and the second linkage gears are engaged with each other.

* * * * *